(12) United States Patent
Canova et al.

(10) Patent No.: US 7,230,813 B1
(45) Date of Patent: Jun. 12, 2007

(54) ELECTRONIC CIRCUIT BREAKER

(75) Inventors: Antonio Canova, Arezzo (IT);
Francesco Bittoni, Arezzo (IT);
Lorenzo Cincinelli, Arezzo (IT)

(73) Assignee: Power-One, Inc., Camarillo, CA (US)

( * ) Notice: Subject to any disclaimer, the term of this patent is extended or adjusted under 35 U.S.C. 154(b) by 293 days.

(21) Appl. No.: 11/055,531

(22) Filed: Feb. 10, 2005

Related U.S. Application Data

(63) Continuation-in-part of application No. 10/246,513, filed on Sep. 18, 2002, now abandoned.

(30) Foreign Application Priority Data

Sep. 18, 2001 (EP) .................................. 1830592

(51) Int. Cl.
*H02H 3/20* (2006.01)
(52) U.S. Cl. .................................. 361/93.1
(58) Field of Classification Search ............... 361/93.1, 361/93.2, 93.9, 62
See application file for complete search history.

(56) References Cited

U.S. PATENT DOCUMENTS

| | | | |
|---|---|---|---|
| 4,685,024 A | 8/1987 | Martellock et al. ........... 361/93 |
| 4,841,219 A * | 6/1989 | Lonergan ..................... 323/274 |
| 4,853,820 A | 8/1989 | Ham, Jr. et al. .............. 361/59 |
| 4,943,761 A | 7/1990 | Fox et al. .................... 323/283 |
| 5,191,278 A * | 3/1993 | Carpenter .................... 323/275 |
| 5,305,174 A * | 4/1994 | Morita et al. ................. 361/63 |
| 5,440,441 A * | 8/1995 | Ahuja ......................... 361/62 |
| 5,581,433 A | 12/1996 | Jordan ........................ 361/18 |
| 5,894,394 A | 4/1999 | Baba et al. ................... 361/87 |
| 5,926,010 A | 7/1999 | Hosokawa et al. ......... 323/222 |
| 6,590,757 B2 * | 7/2003 | Pahl et al. ................. 361/93.2 |
| 2005/0078024 A1 * | 4/2005 | Harrington .................. 341/155 |

OTHER PUBLICATIONS

Article entitled "Circuit Breaker has Programmable Delay," Electrical Design News, Cahners Publishing Co., vol. 42, No. 2, Jan. 16, 1997, p. 101.

* cited by examiner

*Primary Examiner*—Stephen W. Jackson
*Assistant Examiner*—Boris Benenson
(74) *Attorney, Agent, or Firm*—Waddey & Patterson; Mark J. Patterson

(57) ABSTRACT

The electronic circuit breaker comprises an input for connection to a power-supply network and an output for connection to a load. Set between the input and the output are a switch and a limitation block which controls the switch to cause at least partial inhibition thereof in the event of over-current. The circuit breaker further includes a microprocessor connected to the limitation block to inhibit power supply to the load.

31 Claims, 6 Drawing Sheets

ELECTRONIC CIRCUIT BREAKER

CROSS-REFERENCES TO RELATED APPLICATIONS

This application is a Continuation-In-Part application which claims benefit of U.S. patent application Ser. No. 10/246,513 filed Sep. 18, 2002, now abandoned entitled "Electronic Circuit Breaker" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an electronic circuit breaker for interrupting electric power supply to a user circuit when the current exceeds a pre-set value, for instance in the case of a short circuit.

There currently exist various types of circuit breakers for protecting circuits from over-currents. Some of these circuit breakers are of a thermal type and are based on the use of bimetallic strips, the deformation of which, on account of the dissipation of heat by the Joule effect due to the passage of current, causes opening of the circuit by a switch. In other circuit breakers, those of the electromagnetic type, interruption is caused by the movement of an armature under the effect of a magnetic field generated by a coil traversed by the current. In either case, an excessive current flowing through the strip (in the case of a thermal circuit breaker) or through the coil (in the case of a magnetic circuit breaker) causes tripping of the circuit breaker.

Thermal circuit breakers present the drawback of having a high tripping time and of being considerably unreliable owing to the effect that ambient-temperature variations can have on their operation even when appropriate measures are taken to offset the effect of these variations.

Magnetic circuit breakers can be built in such a way that they trip very fast, this being necessary for protecting present-day circuits that comprise solid-state components. However, their tripping speed is not altogether satisfactory. In addition, their reliability is low in that they feel the effects of external factors, such as variations in temperature, mechanical vibrations, magnetic interference, etc. In addition, the presence of a mobile armature sets limits to the freedom of choice of the position in which these circuit breakers can be installed, on account of the influence that the force of gravity may have on the tripping characteristics of these devices.

There also exist electronic circuit breakers, for example of the type described in U.S. Pat. No. 4,979,068. Also these circuit breakers are not altogether satisfactory.

A purpose of the present invention is to provide an electronic circuit breaker which overcomes the drawbacks presented by traditional circuit breakers. In particular, a purpose of the present invention is to provide a reliable electronic circuit breaker that has characteristics of high durability and very short tripping times and enables limitation of peak current.

A further purpose of the present invention is to provide a device that can be programmed.

BRIEF SUMMARY OF THE INVENTION

These and further purposes and advantages, which will emerge clearly to a person skilled in the art from the ensuing text, are basically obtained with an electronic circuit breaker comprising, between the input and the output of the circuit breaker, at least one switch and one limitation block which controls said switch to cause at least partial inhibition in the event of over-current, and a microprocessor connected to said limitation block to cut off power supply to the load connected to the circuit breaker.

In this way, an over-current causes tripping of the limitation block and at least partial opening of the circuit by the switch, for example a MOSFET. The tripping time is extremely short, i.e., of the order of hundreds of microseconds. Within a delay time that may be advantageously programmed by the microprocessor, the latter sends the circuit breaker into a state of inhibition and cuts off supply to the load. The circuit breaker can now be reset by means of the reset signal of the microprocessor, once the cause of its tripping has been determined.

The use of a microprocessor enables a plurality of functions and advantages to be achieved. In particular, the delay in intervention of the switch, which brings about complete inhibition or interruption of the circuit breaker (the so-called "tripping"), and the value of the current that causes opening of the circuit by the circuit breaker are programmable and may possibly be modified also remotely by means of an input/output terminal of the microprocessor and a serial port. The operating parameters of the circuit breaker (voltage at the terminals, current) can be stored and then read whenever necessary by means of the same input/output terminal and the same serial port that enable programming. The circuit breaker can be remotely controlled.

The circuit breaker according to the invention presents numerous advantages as compared to circuit breakers of the prior art. It is more reliable, with an MTBF up to five times longer than that of other known circuit breakers. The current is limited in extremely short time intervals, even during the tripping time, i.e., the time interval up to complete opening of the circuit. The programmability of the device renders it extremely versatile. Furthermore, as will be clarified in what follows, by using the microprocessor it is possible to provide various functions without the need for auxiliary components. In particular, it is possible to detect the input voltage of the circuit breaker and program opening of the circuit by means of the microprocessor when the voltage oversteps a given value, which is programmable. This renders superfluous the use of other electromechanical devices that are sensitive to over-voltages. The current that flows through the circuit breaker can be determined by the microprocessor itself and communicated to the outside world; this fact eliminates the need for separate current sensors.

Further advantageous features and embodiments of the invention are specified in the attached dependent claims.

A better understanding of the invention will be provided by the ensuing description and the attached drawing, which illustrates a possible, non-limiting, embodiment of the invention.

DETAILED DESCRIPTION OF THE INVENTION

Figure 1:
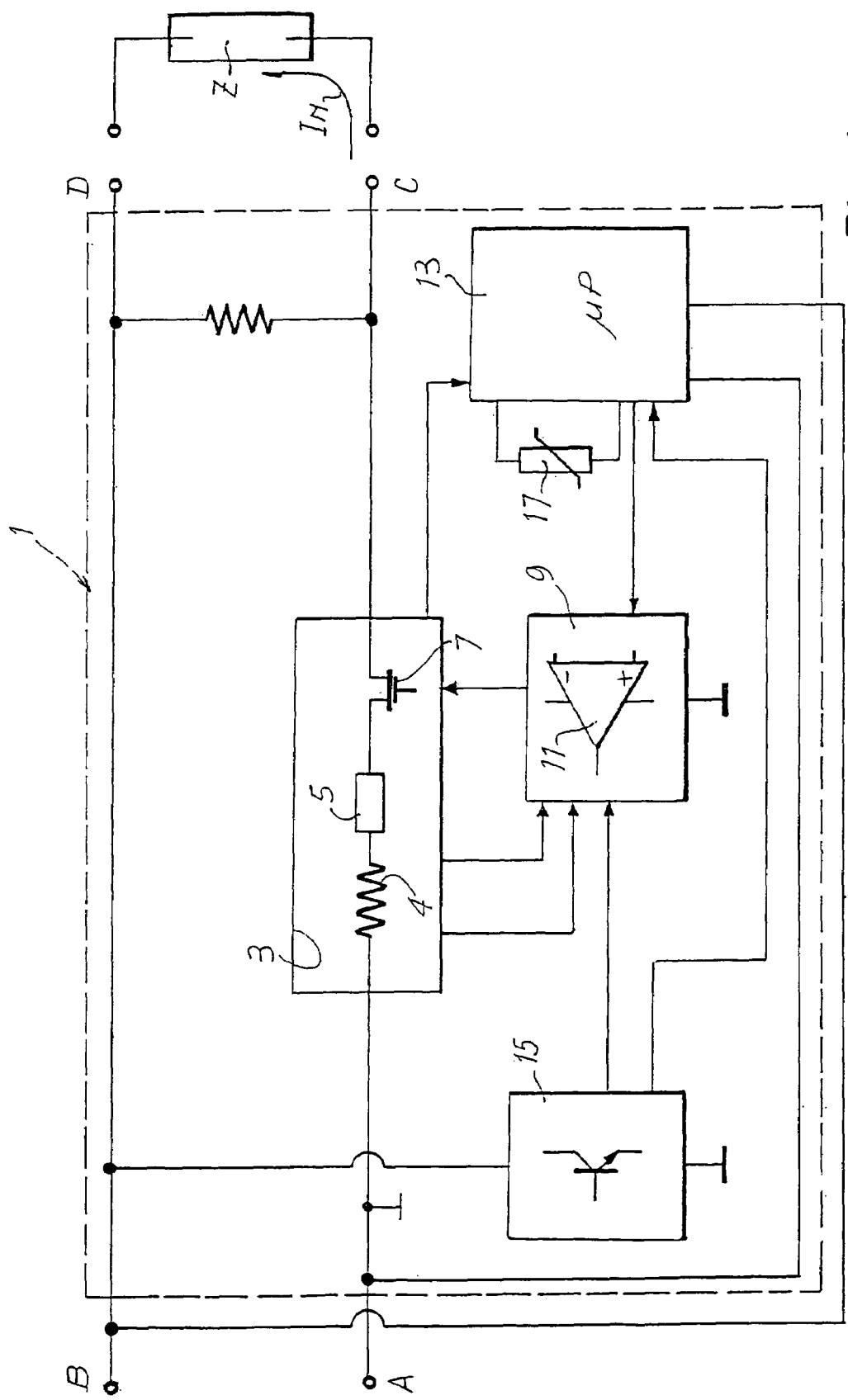
FIG. 1 shows a block diagram of the circuit breaker according to the invention.

With reference initially to the diagram in FIG. 1, the circuit breaker, designated as a whole by reference numeral 1, has an input consisting of two terminals, A and B, and an output consisting of two terminals, C and D. On the line A-C there is set a block 3 which contains a current-read resistor 4, by means of which the current that traverses the circuit breaker and that supplies a load circuit, or load, which is connected between the output terminals C and D, is read. The block 3 moreover contains at least one fuse 5 and one electronic switch 7. The fuse 5 constitutes a so-called "catastrophic protection", i.e., it blows, so interrupting definitively the passage of current, for example in the event of a short circuit. In this case, the device must be replaced, or at least the fuse must be replaced, whereas in other tripping situations, as will be clarified in what follows, it is sufficient to reset the circuit breaker that has tripped on account of an over-current condition. The electronic switch 7, for example a MOSFET, constitutes a protection against transient over-currents, and opens the circuit in the way described in what follows.

The reference number 9 designates a limitation block which comprises an operational amplifier 11 and is connected both to the block 3 and to a microprocessor 13. The limitation block 9 and the microprocessor 13 are supplied by an auxiliary voltage generator 15.

In addition to being connected to the limitation block 9, the microprocessor 13 is also connected to the block 3 and to a resistor 17 that can vary with temperature, for example a PTC or an NTC resistor, which is thermally coupled to the components of the circuit breaker that are subject to overheating.

Operation of the device outlined above is as described in what follows. In conditions of normal supply to the load Z (applied to the terminals C, D of the device), a current $I_N$ is supplied. The fuse 5 is intact, and the MOSFET 7 is in full conduction.

In the case of a catastrophic event, such as a short circuit, the fuse 5 causes the circuit breaker 1 to open the circuit instantaneously and irreversibly, and the power supply to the load is thus interrupted.

In the event of over-current to the load Z, i.e., in the event of the current exceeding a pre-set limit value $I_{limit}$, the limitation block 9, by means of the operational amplifier 11, sends the MOSFET 7 of the block 3 into a condition of partial inhibition. The time required for this inhibition to occur is very short, i.e., in the region of 300 microseconds or even less. The current that is now flowing through the circuit breaker is kept below a value $I_{limit}$ for a delay time that can be programmed by means of the microprocessor 13. Once this time interval has elapsed, the microprocessor 13 causes complete inhibition of the MOSFET 7 or other equivalent switching device, so bringing the current on the load to a stand-by value $I_{stand-by}$ that is very limited.

Figure 3:
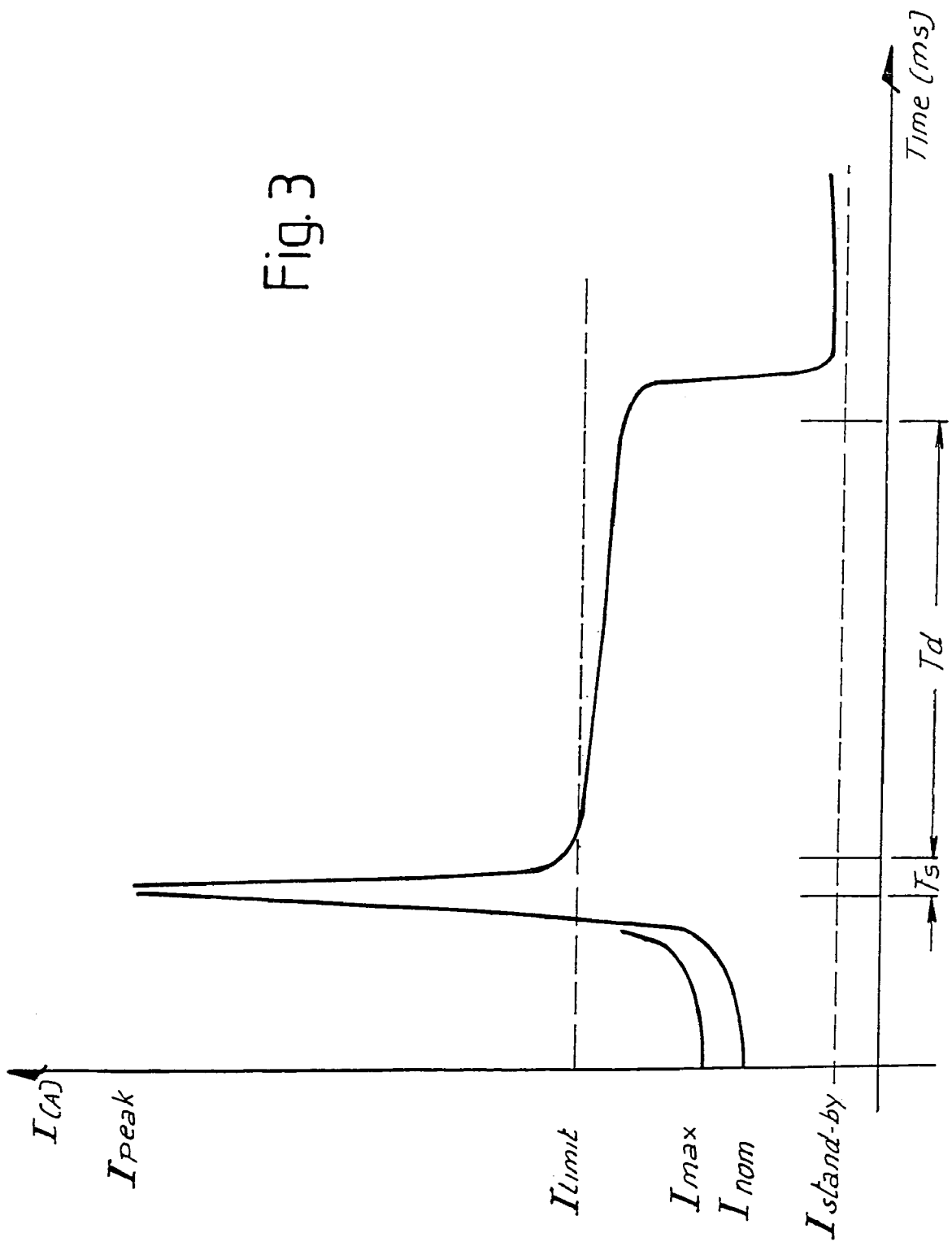
FIG. 3 shows the current-time characteristic of the circuit breaker according to the invention.

FIG. 3 shows the tripping characteristic of the circuit breaker in these conditions. The time appears on the abscissa, and the current values appear on the ordinate, as indicated above. The graph shows the plots of the nominal or rated current $I_{nom}$ and the maximum current $I_{max}$ for which the circuit breaker is designed. The peak-current value is designated by $I_{peak}$, this value being reached in a very short time interval Ts, i.e., the time needed for the limitation block 9 to go into action. The delay time between intervention of the limitation block 9 and intervention of the microprocessor 13 (tripping) is designated by Td.

The resistor 17, which is variable according to the temperature, constitutes a temperature sensor for the microprocessor 13, said temperature sensor enabling interruption of power supply in the event of overheating, by means of appropriate programming of the microprocessor itself.

Since the microprocessor 13 is connected to the block 3, it can determine, by means of the current-read resistor 4, the current instantaneously flowing through the circuit breaker. A connection between the terminals A and B moreover enables the instantaneous voltage to be read, and hence enables opening of the circuit, which is controlled by the microprocessor itself, also in the event of over-voltage.

Figure 2:
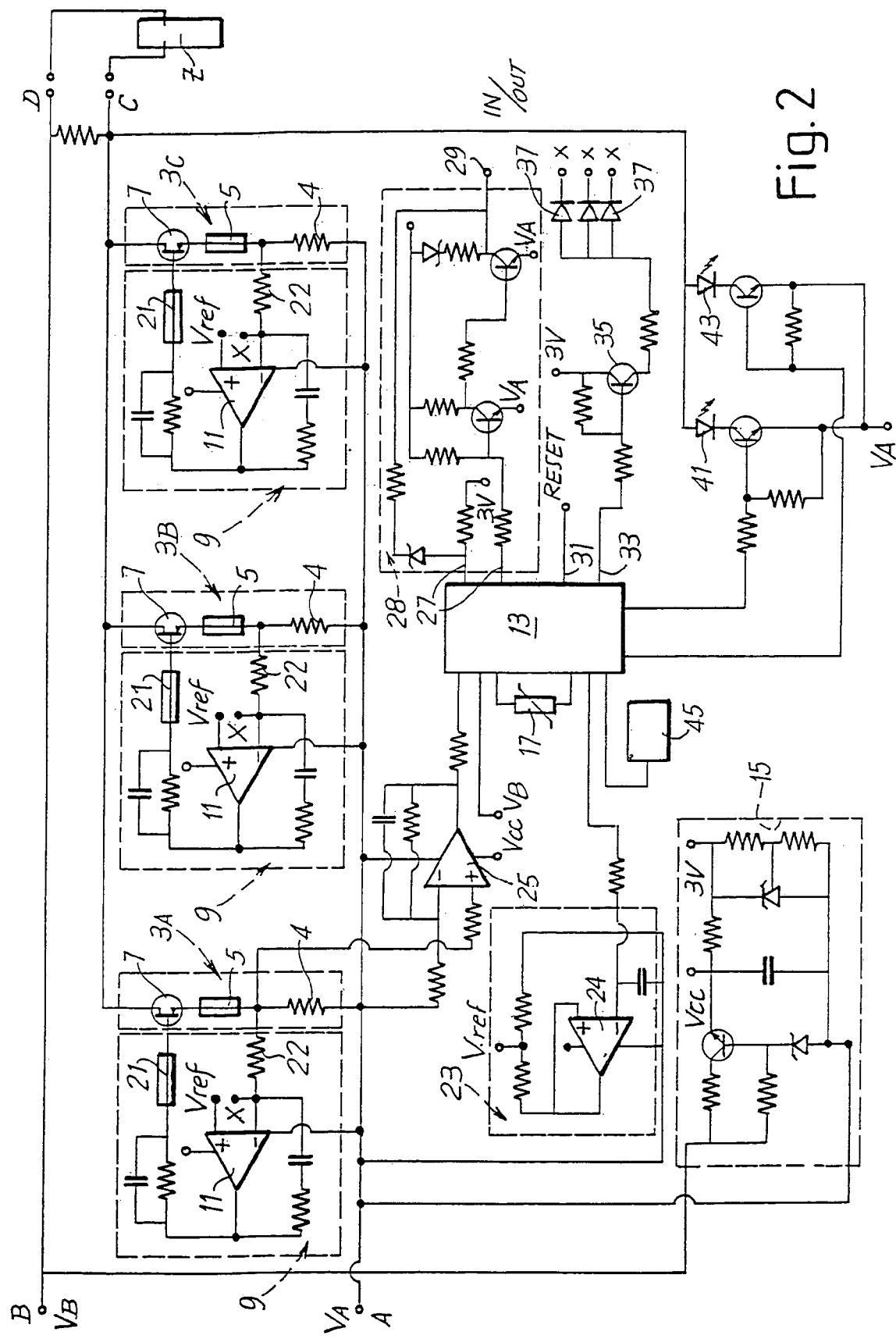
FIG. 2 shows a more detailed diagram of an embodiment of the invention.

FIG. 2 presents a more detailed schematic diagram of an embodiment of the circuit breaker according to the invention, in which there are shown only the components that are essential for enabling understanding and reproduction of the invention. The same reference numbers designate parts that are the same as or correspond to those appearing in the block diagram of FIG. 1.

The circuit of FIG. 2 comprises three blocks, indicated by 3A, 3B, 3C, that are functionally equivalent to block 3 of FIG. 1, the said blocks being connected in parallel together and being basically the same as one another. The blocks 3 may vary in number according to the maximum current for which the circuit breaker has been sized. The larger the current for which the circuit breaker is to be sized, the greater the number of blocks 3, 3A, 3B, 3C, . . . , set in parallel, each being traversed by a fraction of the total current supplied to the load Z.

Each block 3A, 3B, 3C comprises an operational amplifier 11, the output of which is connected to the gate terminal of the MOSFET 7. The source terminal of the MOSFET 7 is connected to the terminal A of the circuit breaker 1, whilst the drain terminal is connected to the terminal C. The current-read resistor is designated by 4, and the fuse is designated by 5, both of these being set between the source terminal of the MOSFET 7 and the terminal A of the circuit breaker 1. Set between the output of the operational amplifier 11 and the gate terminal of the MOSFET 7 is a further protection fuse 21, which is set in series to a parallel RC cell.

The inverting input of the operational amplifier 11 of each block 3A, 3B, 3C is connected, by means of a resistor 22, between the current-read resistor 4 and the fuse 5, whilst applied to the non-inverting terminal of the amplifier itself is a reference voltage $V_{ref}$ which is generated by a circuit, designated as a whole by 23, which is connected to the microprocessor 13 and is described in greater detail in what follows.

The voltage across the current-read resistor 4 is applied to the inputs of an operational amplifier 25, the output of which is connected to the microprocessor 13, which thus receives a signal that is proportional to the current flowing through the resistor 4. The circuit arrangement described so far is envisaged only for the block 3A, whereas it is absent in the blocks 3B and 3C. Since the three blocks 3A, 3B, 3C are basically the same, the total current supplied to the load Z is equal to three times the current read by the microprocessor 13 by means of the current-read resistor 4 through the amplifier 25.

In the circuit diagram of FIG. 2, two terminals 27 are shown, which are connected, by means of an interface 28, to an input/output terminal 29, which constitutes a connection of the microprocessor 13 with the outside world. By means of this interface, the microprocessor 13 can be programmed and interrogated, for example to check the operating conditions of the device. Interrogation and programming can be carried out also remotely.

The reference number 31 designates a reset terminal of the microprocessor 13, while 33 designates a terminal via which the microprocessor 13 is connected to the blocks 3A, 3B, 3C. More in particular, the terminal 33 is connected to the inverting input of each operational amplifier 11 of the various blocks 3A, 3B, 3C through a transistor 35 and a corresponding diode 37. Connection between each diode 37 and the corresponding inverting input of the corresponding operational amplifier 11 is represented by the letter X.

Also shown in the diagram of FIG. 2 are two LEDs, 41 and 43, which are connected to corresponding pins of the microprocessor 13 and which enable display of the operating conditions of the circuit breaker 1, and a storage block 45 connected to the microprocessor 13, in which the information regarding the operating conditions of the circuit breaker 1 is stored, this information being readable by means of the input/output terminal 29.

The circuit 23 comprises an operational amplifier 24, the inverting input of which is connected to the microprocessor 13, and on the output of which there is present the reference voltage $V_{ref}$. The value of the latter is programmable by means of the microprocessor 13 according to the characteristics that the circuit breaker 1 is to possess.

FIG. 2 is a schematic representation of the configuration, in itself known, of the auxiliary voltage generator 15, connected to the two terminals A and B of the circuit breaker 1. The auxiliary voltage generator 15 generates two DC voltages, e.g., 12 V and 3 V, on the terminals designated by $V_{cc}$ and 3 V. These voltages are used to supply the various circuit components, according to what is illustrated in the diagram of FIG. 2.

In line with what has been briefly described with reference to the block diagram of FIG. 1, the circuit of FIG. 2 operates as described in what follows. In normal operating conditions, the current flows through the blocks 3A, 3B, 3C towards the load Z. The MOSFETs 7 are in full conduction. In the event of over-current, there is the intervention of each of the operational amplifiers 11. The value at which the latter go into action is fixed by the reference voltage $V_{ref}$ which is determined by a corresponding programming of the microprocessor 13. The time for intervention of the individual operational amplifiers 11 is very limited (less than 300 microseconds), and they have the effect of reducing the current flowing from the terminal A to the terminal C towards the load. After a programmable delay time, the microprocessor 13 goes into action, by means of the output voltage on the pin 33 sent to the individual amplifiers 11 of the blocks 3A, 3B, 3C, and sends the individual MOSFETs 7 into a state of inhibition, thus reducing the current to the tripping value $I_{stand-by}$. The microprocessor can act on the blocks 3, causing inhibition of the switches 7 also in the case of overheating, which is detected by the resistor 17, which is temperature-variable.

According to a further embodiment, the microprocessor 13 can be programmed so that the time delay Td with which the circuit breaker is brought into non-conducting condition (by completely inhibiting MOSFET 7) can be made dependent upon the drop voltage across the switch itself. The dependency between time delay Td and voltage drop across switch 7 is such that the higher the drop voltage across the MOSFET 7 the shorter the delay time Td. This possibility is based the idea of keeping the MOSFET 7 into its so-called SOAR area (Safe Operating ARea), which depends on the voltage applied across the device, the current flowing therethrough and the power. The microprocessor 13 can thus be programmed such as to set a Td value for each one of a set of possible voltage drop values across the MOSFET 7, or else, it can be programmed such that Td is calculated as a function of the voltage drop, which can be detected according to standard techniques. It is also possible to combine the pre-setting of said Td times by means of pre-programming the microprocessor with a calculation of the value based on the voltage drop. For example a maximum Td can be set by properly programming the microprocessor, and a shorter Td can be selected or set if the voltage drop across switch 7 is higher than a minimum value.

Figure 4:
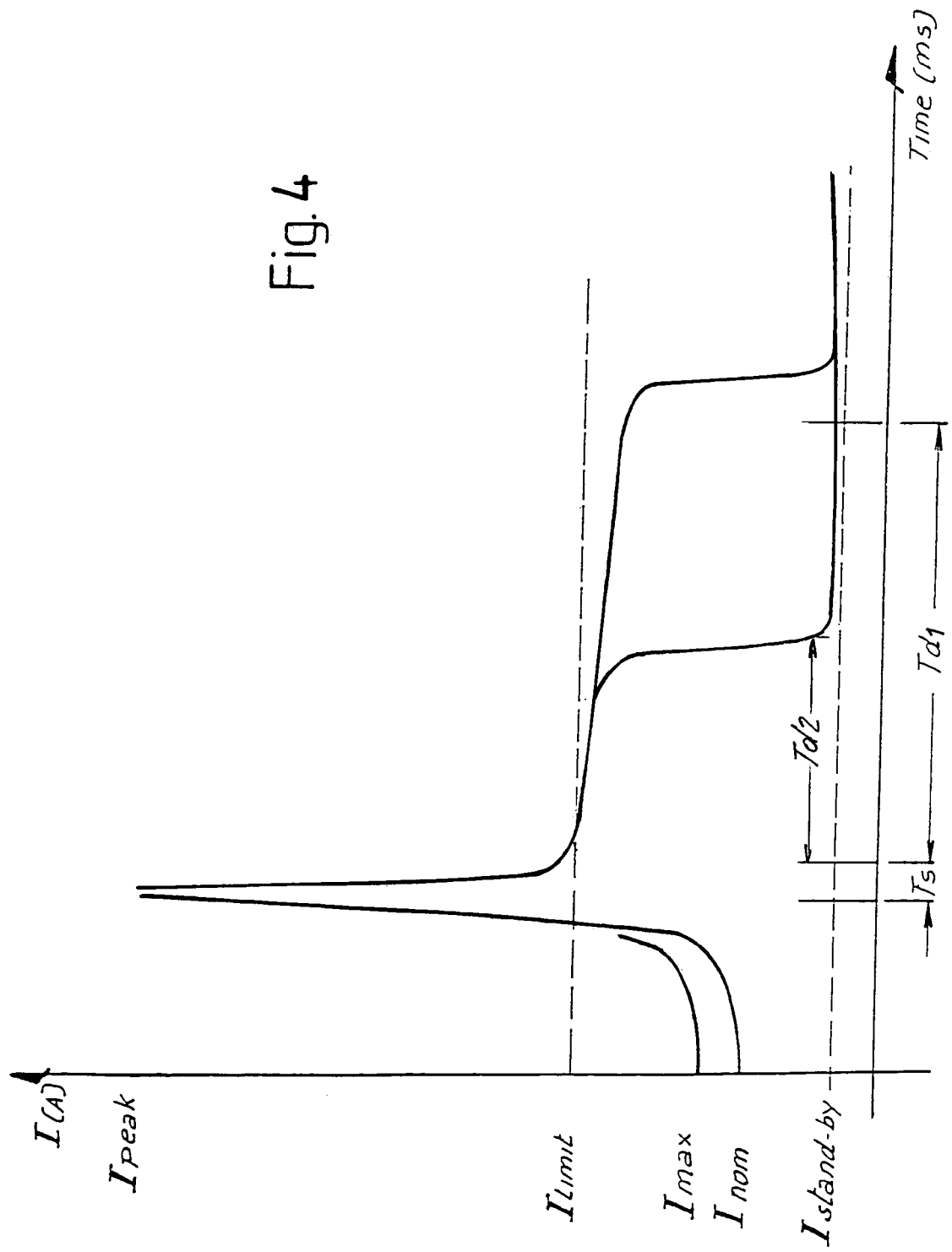
FIG. 4 shows a current-time characteristic in an improved embodiment of the device according to the invention.
Figure 5:
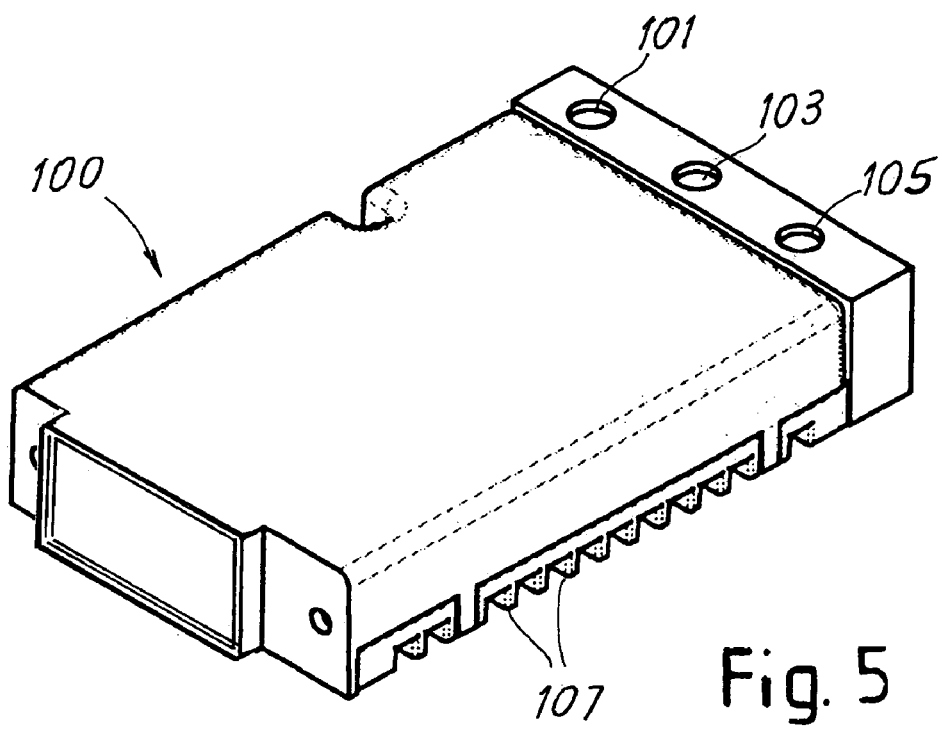
FIG. 5 is a top oblique view of the top of the circuit breaker of the present invention once assembled in its box or housing.
Figure 6:
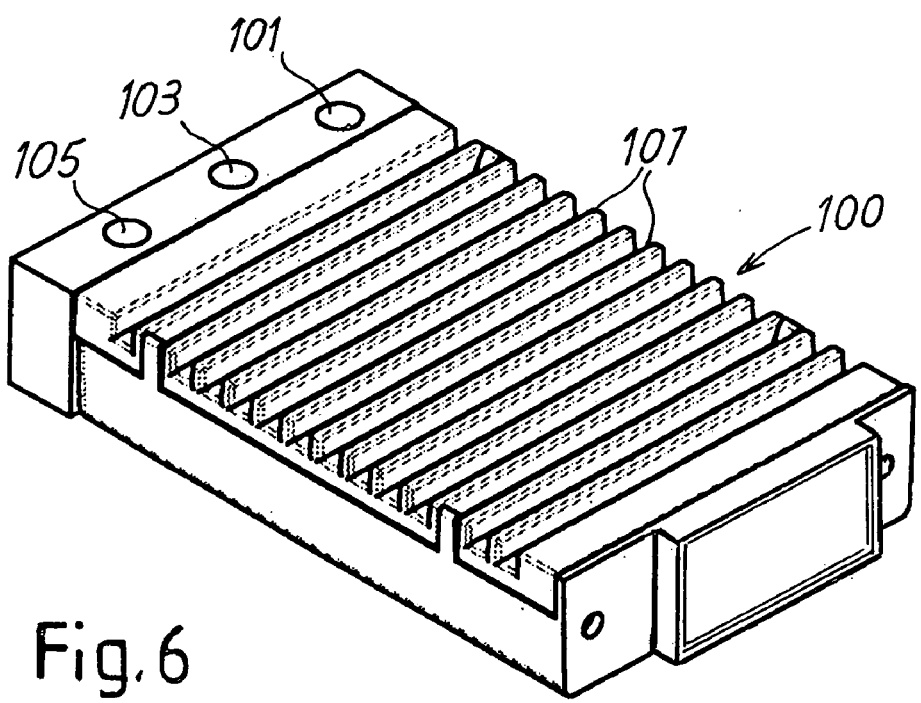
FIG. 6 is a bottom oblique view of the circuit breaker and housing as shown in FIG. 5.
Figure 7:
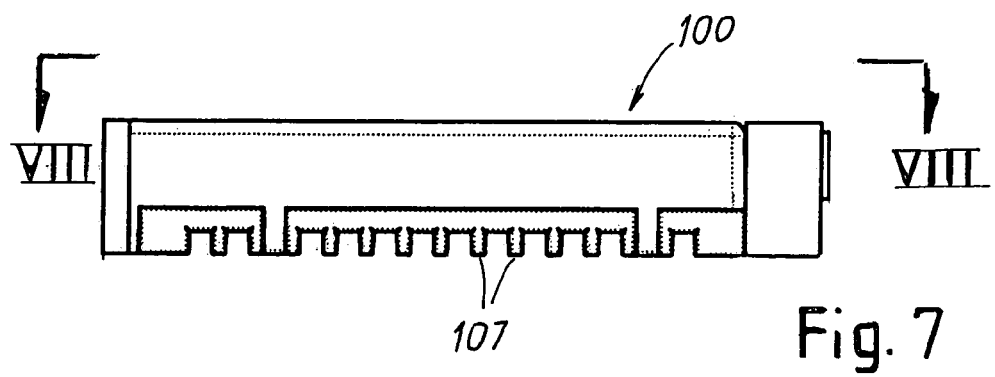
FIG. 7 is a side view of the circuit breaker and housing as shown in FIGS. 5 and 6.
Figure 8:
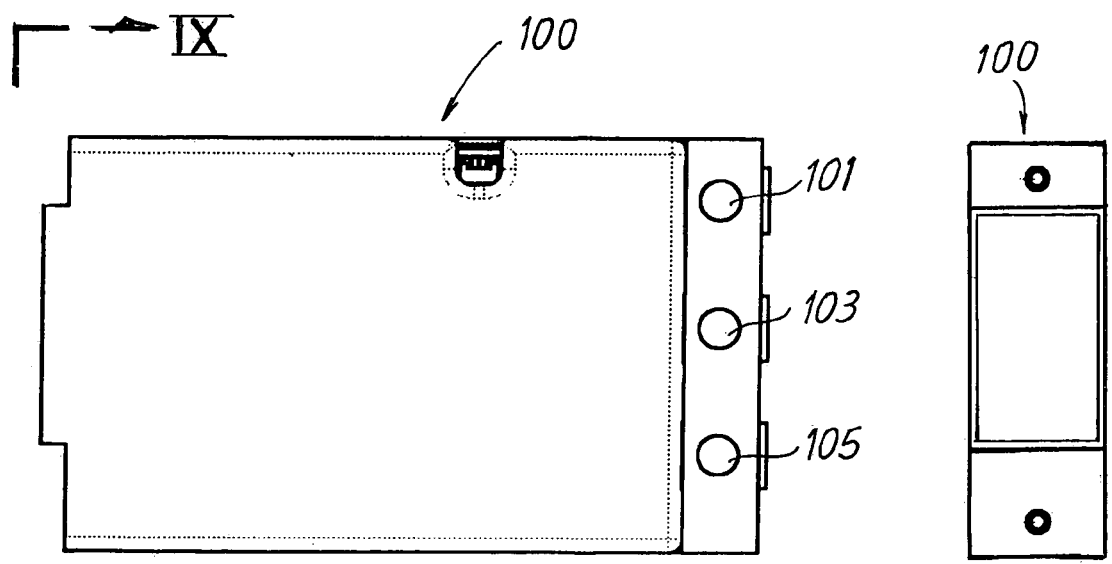
FIG. 8 shows a plan view according to VIII—VIII of FIG. 7.
Figure 9:
FIG. 9 shows an end view according to IX—IX of FIG. 8.

FIG. 4 shows a diagram similar to the one in FIG. 3, wherein, however, two different time delays (Td1 and Td2) are provided depending upon the voltage drop detected by the microprocessor across the MOSFET switch 7. The time delay Td2 is shorter than Td1. Time delays Td1 and Td2, therefore, are determined by the microprocessor in conjunction with two different voltage drops across the MOSFET 7, the time delay Td2 being calculated and set for a higher voltage drop than the time delay Td1. The voltage drop is detected during operation of the breaker, e.g. after the switch 7 has been partially inhibited by limiting block 9. The microprocessor 13 can be connected to the switch 7 such as to directly detect the voltage drop across said switch, or else a voltage drop across a circuit portion including said switch, e.g. across components 4, 5, 7 in the circuit branches 3A, 3B, 3C of FIG. 2 or else of at least one of said branches. In any event the microprocessor is able to detect a voltage drop which is variable and is linked to the voltage drop across the actual switch 7 (or else one or each of the switches 7 of a circuit breaker having more than one switch 7 a depicted in the example of FIG. 2).

The circuit breaker described so far can be housed in a box 100 as shown in FIGS. 5 to 9. The outer dimensions and the position and center distance of the outer contacts 101, 103, 105 of the box can be identical to those typically seen in a magnetic circuit breaker. The box is provided with fins 107 for heat dissipation. This layout of the box makes it possible to replace a common magnetic circuit breaker with an electronic circuit breaker according to the invention without changing the circuit to which the breaker is combined.

The use of a MOSFET or of a plurality of MOSFETs 7 as electronic switches provides the possibility to arrange several circuit breakers in parallel, since each MOSFET 7 is provided with its parallel diode.

The circuit breaker according to the invention can be designed for currents in the range of 40–60 A.

It is understood that the drawings only illustrate a possible exemplification of the invention, which may vary in its embodiments and arrangements without thereby departing from the scope of the underlying idea.

Thus, although there have been described particular embodiments of the present invention of a new and useful Electronic Circuit Breaker, it is not intended that such references be construed as limitations upon the scope of this invention except as set forth in the following claims.

What is claimed is:

1. An electronic circuit breaker with an input for connection to a power-supply network and an output for connection to a load, comprising:
   between said input and said output at least one switch and at least a limitation block which controls said switch to cause partial inhibition thereof in the event of over-current; and
   a microprocessor connected to said limitation block to cut off power supply to the load after a time delay following partial inhibition of said switch.

2. The circuit breaker according to claim 1, wherein said time delay is programmable.

3. The circuit breaker according to claim 1, wherein said time delay is variable according to a voltage drop across said switch.

4. The circuit breaker according to claim 2, wherein said time delay is variable according to a voltage drop across said switch.

5. The circuit breaker according to claim 1, wherein said microprocessor is arranged to detect a voltage value which is a function of a voltage drop across said switch and wherein said microprocessor is programmed to modify said time delay as a function of said detected voltage value.

6. The circuit breaker according to claim 1, wherein said limitation block comprises an operational amplifier, to a first input of which there is applied a signal proportional to the current that traverses said switch, and to the second input of which there is applied a reference voltage.

7. The circuit breaker according to claim 6, wherein said reference voltage is programmable by means of said microprocessor.

8. The circuit breaker according to claim 5, wherein said limitation block comprises an operational amplifier, to a first input of which there is applied a signal proportional to the current that traverses said circuit breaker, and to the second input of which there is applied a reference voltage.

9. The circuit breaker according to claim 8, wherein said reference voltage is programmable by means of said microprocessor.

10. The circuit breaker according to claim 6 or 9, wherein said microprocessor is connected to the inverting input of said operational amplifier.

11. The circuit breaker according to claim 6 or 9, wherein said switch is connected to the output of said operational amplifier.

12. The circuit breaker according claim 1, including at least an over-current protection fuse.

13. The circuit breaker according to claim 12, wherein a fuse is set between the output of said operational amplifier and said switch.

14. The circuit breaker according to claim 1, comprising at least one catastrophic-protection device between its input and its output.

15. The circuit breaker according to claim 1, comprising at least a current sensor for determining the amount of current that flows through said at least one switch.

16. The circuit breaker according to claim 12, wherein said at least one catastrophic-protection device is set in series to said at least one switch.

17. The circuit breaker according to claim 15, wherein said at least one current sensor is set in series to that at least one switch.

18. The circuit breaker according to claim 1, wherein said microprocessor is programmable for intervening with a pre-set delay with respect to the partial inhibition of said switch.

19. The circuit breaker according to clam 1, wherein said microprocessor is connected to a temperature sensor and is programmed to cause opening of the circuit in the event of overheating.

20. The circuit breaker according to claim 1, wherein said microprocessor comprises an input/output terminal for programming and/or communication with the outside world.

21. The circuit breaker according to claim 1, wherein said microprocessor is associated to a memory for storing the parameters for operation of the circuit breaker.

22. The circuit breaker according to claim 1 comprising a plurality of switches, each of which is associated to a corresponding limitation block, said switches being set in parallel with respect to one another, said microprocessor controlling said plurality of switches.

23. The circuit breaker according to claim 1, wherein said microprocessor receives an input signal proportional to an input voltage across the input terminals of said circuit breaker and is programmed in such a way as to cause opening of the circuit by the circuit breaker when said voltage exceeds a pre-determined value.

24. The circuit breaker according to claim 1, wherein said at least one switch includes a MOSFET.

25. A method for controlling a circuit breaker, including the steps of:
   arranging at least an electronically controllable switch between an input and an output of said circuit breaker;
   providing a microprocessor controlling said switch;
   powering a load through said circuit breaker;
   detecting a current flowing through said circuit breaker;
   when the current exceeds a current threshold, partially inhibiting said switch; and
   upon a given time delay following partial inhibition of said switch, if said current still exceeds said threshold, cutting off power supply through said circuit breaker.

26. The method according to claim 25, including the steps of providing a limitation block controlling said at least one switch and partially inhibiting said switch by means of said limitation block.

27. The method according to claim 25, wherein said time delay is programmable.

28. The method according to claim 26, wherein said time delay is programmable.

29. The method according to claim 25, further including the steps of:
   detecting a voltage drop which is a function of the voltage drop across said at least one switch;
   calculating said time delay as a function of said detected voltage drop.

30. The method according to claim 26, further including the steps of:
   detecting a voltage drop which is a function of the voltage drop across said at least one switch;

calculating said time delay as a function of said detected voltage drop.

31. The method according to claim 25, further including the step of detecting an input voltage across input terminals of said circuit breaker, cutting off said circuit breaker when said input voltage exceeds a pre-set over-voltage value.

* * * * *